US010743012B2

(12) United States Patent
Gelman

(10) Patent No.: US 10,743,012 B2
(45) Date of Patent: Aug. 11, 2020

(54) FEATURE COMPENSATED BOREHOLE IMAGE CODING

(71) Applicant: Schlumberger Technology Corporation, Sugar Land, TX (US)

(72) Inventor: Andriy Gelman, Somerville, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 56 days.

(21) Appl. No.: 15/379,666

(22) Filed: Dec. 15, 2016

(65) Prior Publication Data
US 2018/0176499 A1 Jun. 21, 2018

(51) Int. Cl.
| H04N 5/38 | (2006.01) |
| H04N 19/136 | (2014.01) |
| H04N 19/176 | (2014.01) |
| H04N 19/63 | (2014.01) |
| H04N 19/65 | (2014.01) |
| H04N 19/124 | (2014.01) |
| H04N 19/91 | (2014.01) |
| H04N 19/44 | (2014.01) |
| H04N 19/12 | (2014.01) |
| E21B 47/12 | (2012.01) |

(52) U.S. Cl.
CPC .......... *H04N 19/44* (2014.11); *H04N 19/12* (2014.11); *H04N 19/136* (2014.11); *H04N 19/176* (2014.11); *H04N 19/63* (2014.11); *E21B 47/12* (2013.01)

(58) Field of Classification Search
CPC ....... H04N 19/12; H04N 19/172; H04N 19/63
See application file for complete search history.

(56) References Cited

U.S. PATENT DOCUMENTS

| 5,684,693 A * | 11/1997 | Li | ............... E21B 47/12 702/6 |
| 2006/0015257 A1* | 1/2006 | Hassan | ............... E21B 47/00 702/6 |
| 2007/0027629 A1* | 2/2007 | Hassan | ............... G01V 11/002 702/11 |

(Continued)

OTHER PUBLICATIONS

Ingrid Daubechies, and Wim Sweldens, "Factoring Wavelet Transform into Lifting Steps", in Journal of Fourier Analysis and Applications, vol. 4, No. 3, pp. 247-269, 1998.

(Continued)

*Primary Examiner* — Mainul Hasan

(57) ABSTRACT

Image block transmission includes reading an image block from a downhole sensor. Based on the image block, a set of formation features attributes for the image block are detected. The set of formation features attributes describe a structural property of a subsurface formation. Based on the set of formation feature attributes, a wavelet transform function is modified to obtain a modified wavelet transform function. The modified wavelet transform function is applied to the image block to obtain a set of wavelet transform coefficients for the image block. The image block transmission further includes generating an encoded bit stream comprising the set of formation features attributes and the set of wavelet transform coefficients for the image block, and transmitting the encoded bit stream.

16 Claims, 9 Drawing Sheets

(56) References Cited

U.S. PATENT DOCUMENTS

| | | | |
|---|---|---|---|
| 2007/0112521 A1* | 5/2007 | Akimov | E21B 47/12 702/6 |
| 2007/0223822 A1* | 9/2007 | Haugland | G01V 11/002 382/232 |
| 2009/0190850 A1* | 7/2009 | Tang | G01V 11/00 382/251 |
| 2009/0192711 A1* | 7/2009 | Tang | E21B 47/12 702/6 |
| 2010/0049443 A1* | 2/2010 | Mickael | G01V 11/002 702/10 |
| 2013/0116925 A1* | 5/2013 | Hruska | G01V 1/301 702/2 |
| 2015/0276957 A1* | 10/2015 | Caprioli | G01V 1/364 367/7 |
| 2015/0381981 A1 | 12/2015 | Gelman et al. | |
| 2017/0167247 A1* | 6/2017 | Gao | E21B 49/00 |

OTHER PUBLICATIONS

W. Ding, F. Wu, X. Wu, and S. Li, "Adaptive directional lifting-based wavelet transform for image coding", in IEEE Trans. on Image Processing, vol. 16, No. 2, Feb. 2007. pp. 416-427.

Velisavljevic et al., Directionlets: Anisotropic Multi-directional Representation with Separable Filtering, IEEE Transations on Image Processing, Sep. 9, 2005 (30 pages).

* cited by examiner

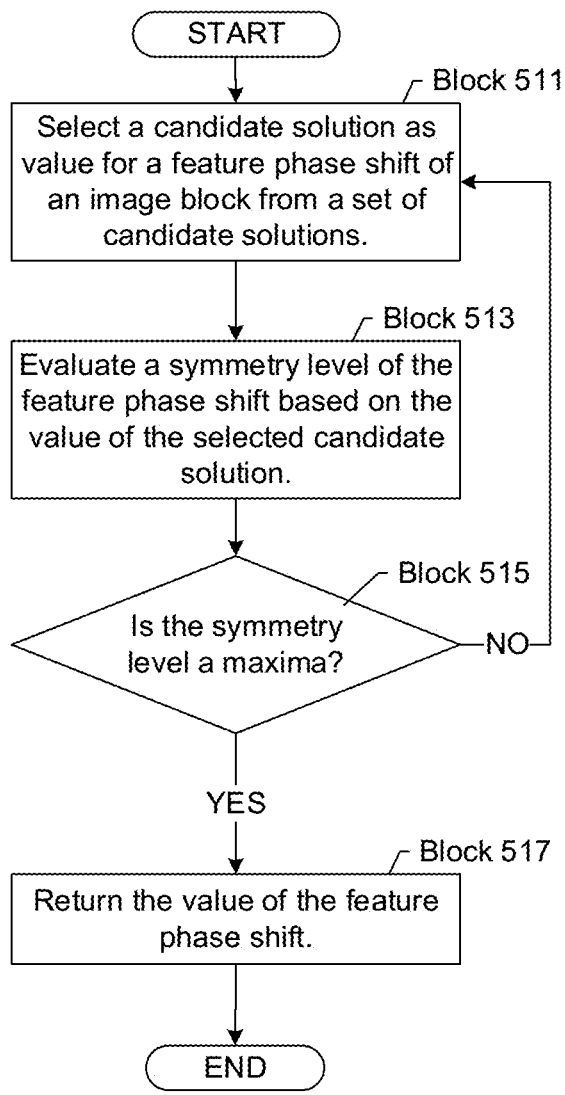
FIG. 5.1
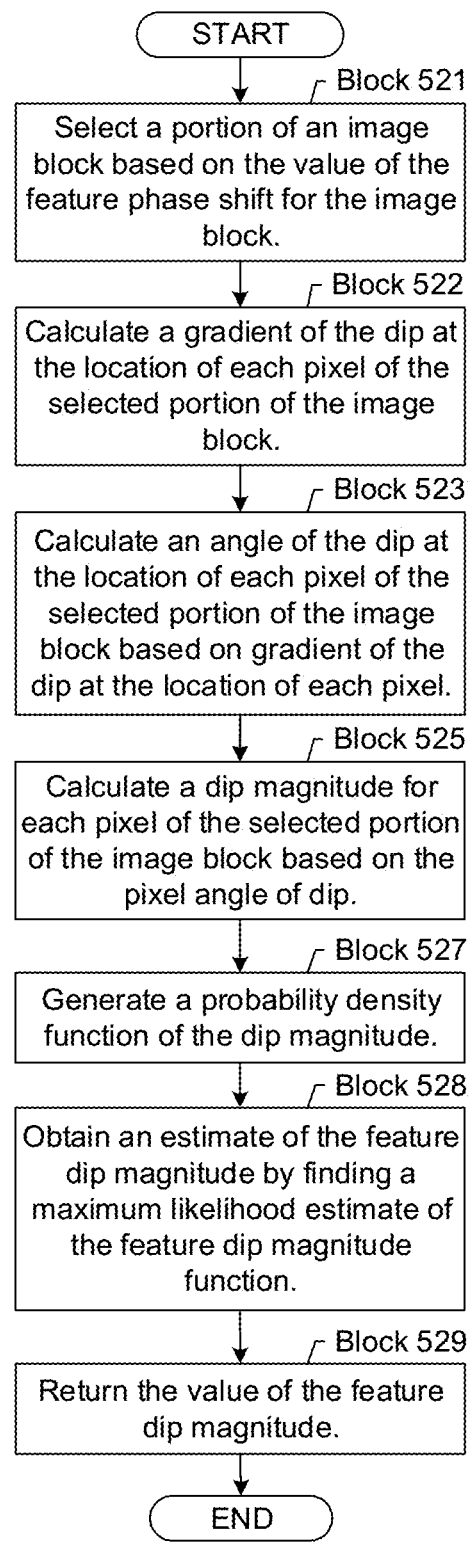
FIG. 5.2

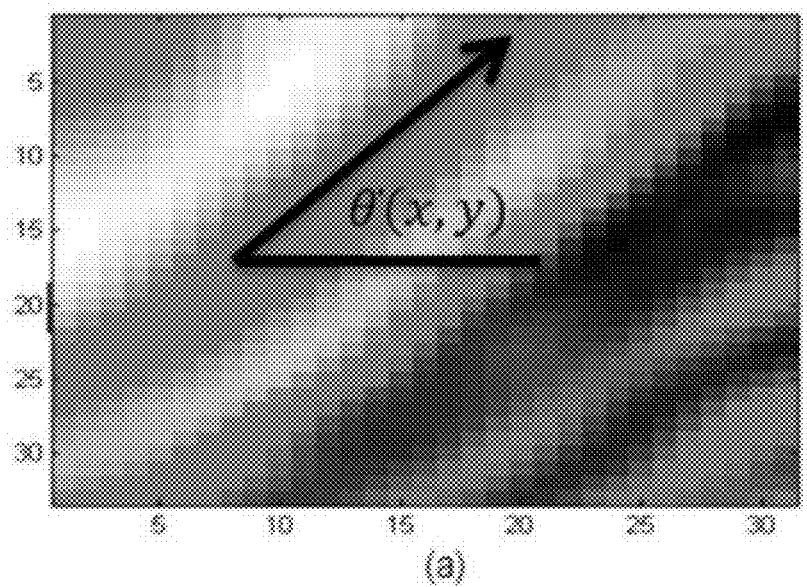
FIG. 7.1
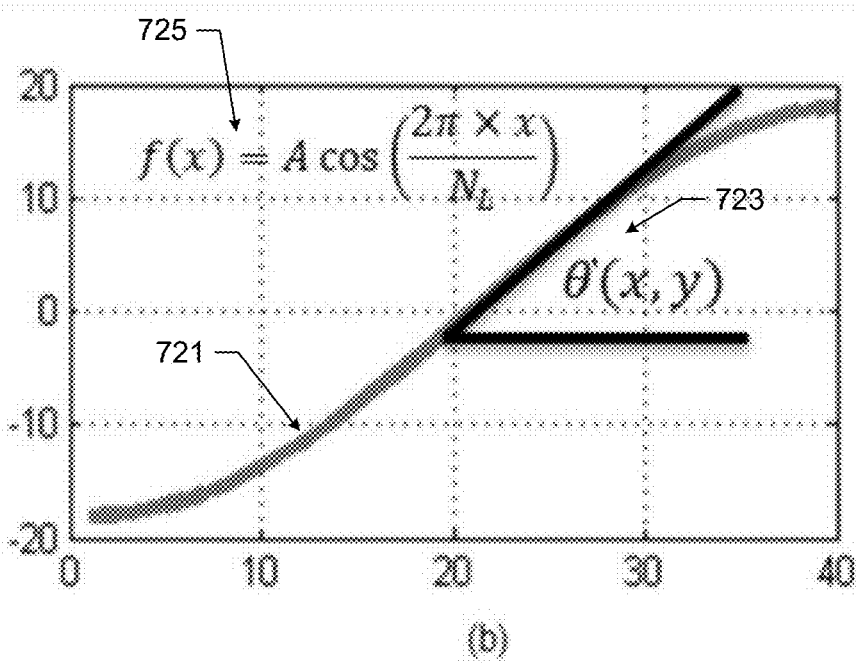
FIG. 7.2

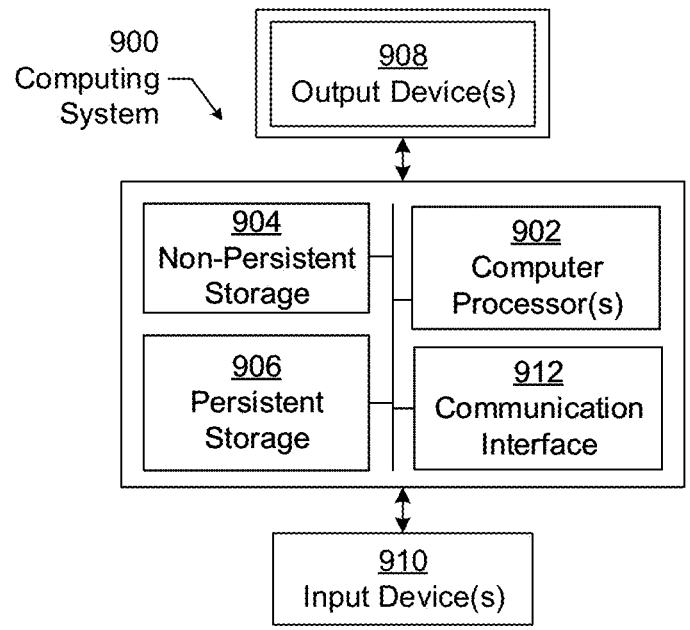
FIG. 9.1
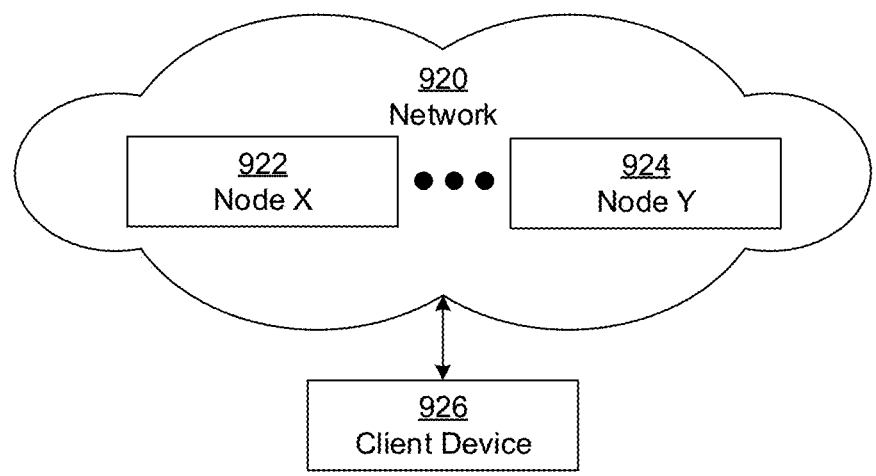
FIG. 9.2

FEATURE COMPENSATED BOREHOLE IMAGE CODING

BACKGROUND

Transmitting subsurface data from the bottom of the well being drilled by a downhole data acquisition equipment is constrained by the limited bandwidth of the logging while drilling telemetry system. In order to improve the quality of the information transmitted by the downhole data acquisition equipment, data compression methods are developed and implemented into the telemetry system.

SUMMARY

In general, in one aspect, one or more embodiments relate to image block transmission that includes reading an image block from a downhole sensor. Based on the image block, a set of formation features attributes for the image block are detected. The set of formation features attributes describe a structural property of a subsurface formation. The method comprises using a Discrete Wavelet Transform for encoding the image block including determining wavelet transform coefficients for the image block based on the set of formation feature attributes. The image block transmission further includes generating an encoded bit stream comprising the set of formation features attributes and the set of wavelet transform coefficients for the image block, and transmitting the encoded bit stream.

Other aspects of the technology will be apparent from the following description and the appended claims.

BRIEF DESCRIPTION OF DRAWINGS

FIG. 4 and FIGS. 5.1 and 5.2 show flowcharts in accordance with one or more embodiments.

FIG. 6, FIGS. 7.1 and 7.2, and FIG. 8 show examples in accordance with one or more embodiments.

FIG. 9.1 shows a computing system in accordance with one or more embodiments.

FIG. 9.2 shows a network system in accordance with one or more embodiments.

DETAILED DESCRIPTION

Figure 1:
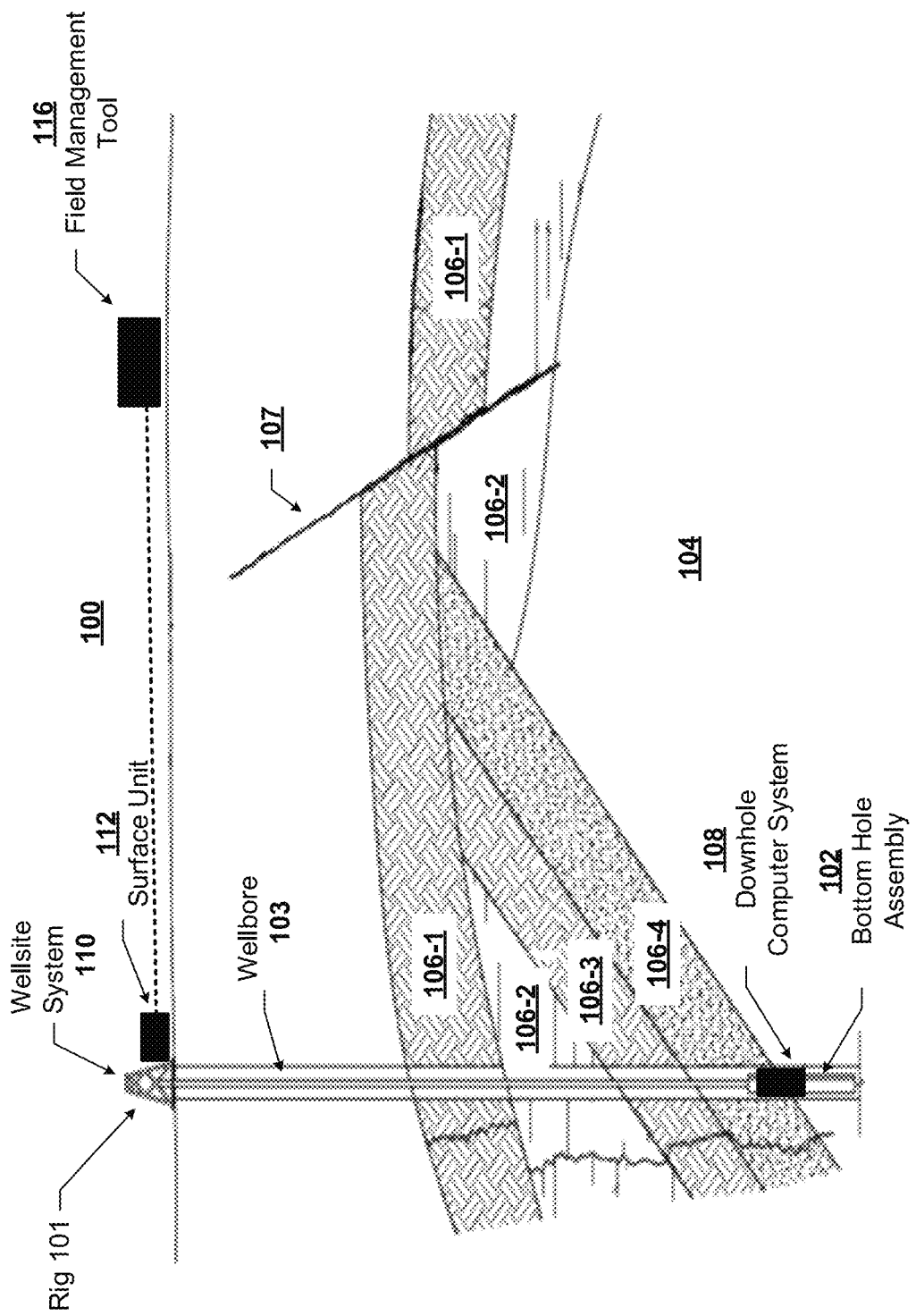
FIG. 1 is a schematic view, partially in cross-section, of a field in which one or more embodiments of feature compensated borehole image coding may be implemented.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to a method for feature based borehole image coding to transmit data from a downhole tool to the surface via a telemetry system. The telemetry system has a limited data rate. Because of the limited data rate, the images are compressed prior to transmission. In order to perform the compression, one or more embodiments apply an encoding based on the formation features in the borehole images. In particular, the encoding models the image use a set of coefficients that represent only a subset of image data. The coefficients are transmitted to the surface, and are used to reproduce the borehole image by approximating the image based on the transmitted information. The approximation uses the coefficients and a set of predefined transform functions (e.g., a dictionary of atoms) associated with the coefficients. By modifying the set of predefined transform functions, the reconstruction of diagonal lines and the borehole image features is improved.

Borehole images show formation features, such as dips, bulls eye and reverse bulls eye, which impact compression performance by creating high pass coefficients in predefined transform functions that are bandwidth expensive to transmit. If the high pass coefficients are truncated in the transmission in order to comply with a bit budget constraint, the reconstruction of the formation features becomes distorted in the decompressed image at the surface. In one or more embodiments, the transform functions are modified to match the formation features. Further, a set of feature attributes for features extracted from the borehole image downhole are sent as side information to the surface and used as feature specific coefficients. Thus, the borehole image is encoded particular to the formation features. Accordingly, one or more embodiments preserve the formation features while minimize data rate usage.

FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

A subterranean formation (104) is in an underground geological region. An underground geological region is a geographic area that exists below land or ocean. In one or more embodiments, the underground geological region includes the subsurface formation in which a borehole is or may be drilled and any subsurface formation that may affect the drilling of the borehole due, for example, to the stresses and lithology existing in the subsurface region. In other words, the underground geological region may not just include the area immediately surrounding a borehole or where a borehole may be drilled, but also any area that affects or may affect the borehole or where the borehole may be drilled. As used herein, subterranean formation, formation, and subsurface formations may be used interchangeably. Further, wellbore, borehole, and hole may be used interchangeably.

As shown in FIG. 1, the subterranean formation (104) may include several subsurface geologic objects like subsurface formations, faults, fractures, beddings, unconformity, and erosion surfaces. For example, the subsurface formations (106-1 through 106-4) of which FIG. 1 provides an example. As shown, the subsurface formations may include a limestone layer (106-1), a shale layer (106-2), another limestone layer (106-3), and a sandstone layer (106-4). A fault line (107) may extend through the formation. In one or more embodiments, various survey tools and/or data acquisition tools are adapted to measure the formation and detect the characteristics of the geological structures of the formation. Further, as shown in FIG. 1, the wellsite system (110) is associated with a rig (101), a wellbore (103), a bottom hole assembly (102) containing a downhole computer system (108), and other field equipment and is configured to perform wellbore operations, such as logging, drilling, fracturing, production, or other applicable operations.

In one or more embodiments, the surface unit (112) is operatively coupled to a field management tool (116) and/or the wellsite system (110). In particular, the surface unit (112) is configured to communicate with the field management tool (116) and/or the wellsite system (110) to send commands to the field management tool (116) and/or the wellsite system (110) and to receive data from the downhole computer system (108). For example, the wellsite system (110) may be adapted for measuring downhole properties using LWD tools to obtain well logs and for obtaining core samples. In one or more embodiments, the surface unit (112) may be located at the wellsite system (110) and/or remote locations. The surface unit (112) may be provided with computer facilities for receiving, storing, processing, and/or analyzing data from the field management tool (116), the downhole computer system (108), or other part of the field (100). The surface unit (112) may also be provided with functional elements for actuating mechanisms at the field (100). The surface unit (112) may then send command signals to the field (100) in response to data received, for example, to control and/or optimize various field operations described above.

During the drilling operation, the bottom hole assembly (102) may perform logging while drilling (LWD), and/or measurement while drilling (MWD) operations to obtain downhole measurements and investigate downhole conditions. Knowledge of the downhole conditions may be used for formation evaluation, well placement and geosteering, and completion design. During LWD, measurements such as gamma ray, resistivity, density, neutron porosity, spectroscopy, sigma, magnetic resonance, and acoustic velocity are acquired via hardware sensors located on the bottom hole assembly (102). The measurements provide information about subterranean formation properties, equipment operating parameters, historical and/or other data. In particular, the measurements may provide information about the structural and physical properties of subsurface formation, rate of penetration, weight on the bit, formation pressure, bottom hole temperature, etc. A set of measurements may form a borehole image and can be acquired and transmitted simultaneous with the drilling of the well.

Fluid, such as drilling mud or other drilling fluids, is pumped down the wellbore (or borehole) through the bottom hole assembly and out the drilling bit. The drilling fluid flows through the annulus between the drilling tool and the wellbore and out the surface, carrying away earth loosened during drilling. The drilling fluids may provide a communication media for the data transferred between the downhole computer system and surface unit. For example, data may be transmitted to surface through pressure pulses sent through the drilling mud (also named mud pulsed telemetry). In other words, the drilling mode is the communication medium through which the data is transmitted.

Although FIG. 1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

Figure 2:
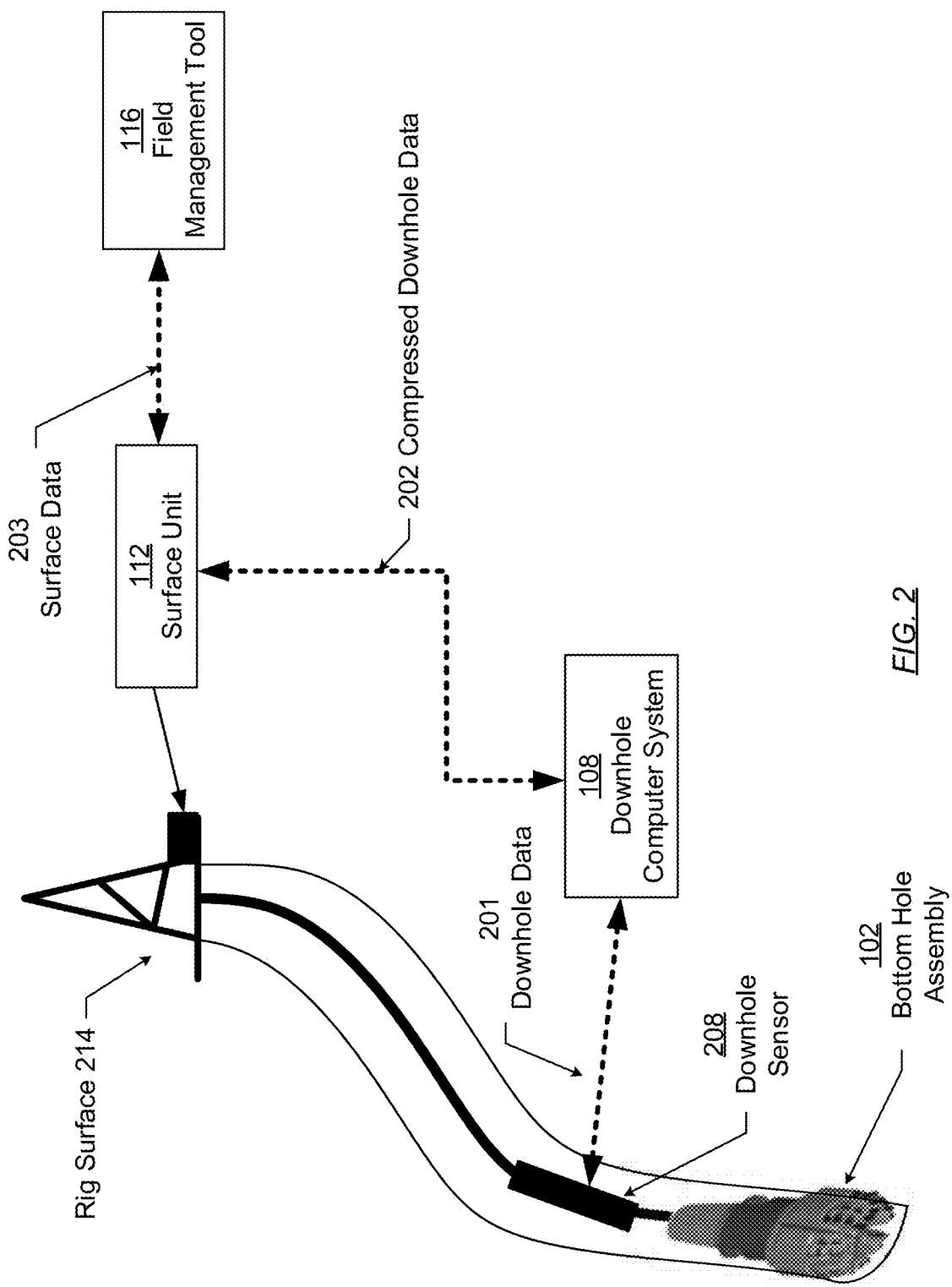
FIG. 2 shows an example of a communication structure in accordance with one or more embodiments.

FIG. 2 shows an example of a communication structure in accordance with one or more embodiments of the technology. As shown in FIG. 2, a downhole computer system (108) is connected to a surface unit (112). The downhole computer system (108) and surface unit (112) may be the same or similar to the downhole computer system and surface unit discussed above with reference to FIG. 1. As shown in FIG. 2, downhole sensors (208) may acquire downhole data (201) compressed by the downhole computer system (108) and the downhole computer system (108) may transmit the compressed downhole data (202) via the communication link to a surface unit (112). In one or more embodiments, the communication link is managed by a telemetry system. Further, wellbore and subsurface formation information may be gathered. The surface unit (112) may compile the gathered information and send the information to the field management tool (116) as surface data (203). In one or more embodiments, the field management tool (116) is configured to generate a field operation control signal based at least on the surface data (203) provided by the surface unit (112), such as based on a borehole image acquired by the downhole sensor (208) and sent to surface by the downhole computer system (108).

Figure 3:
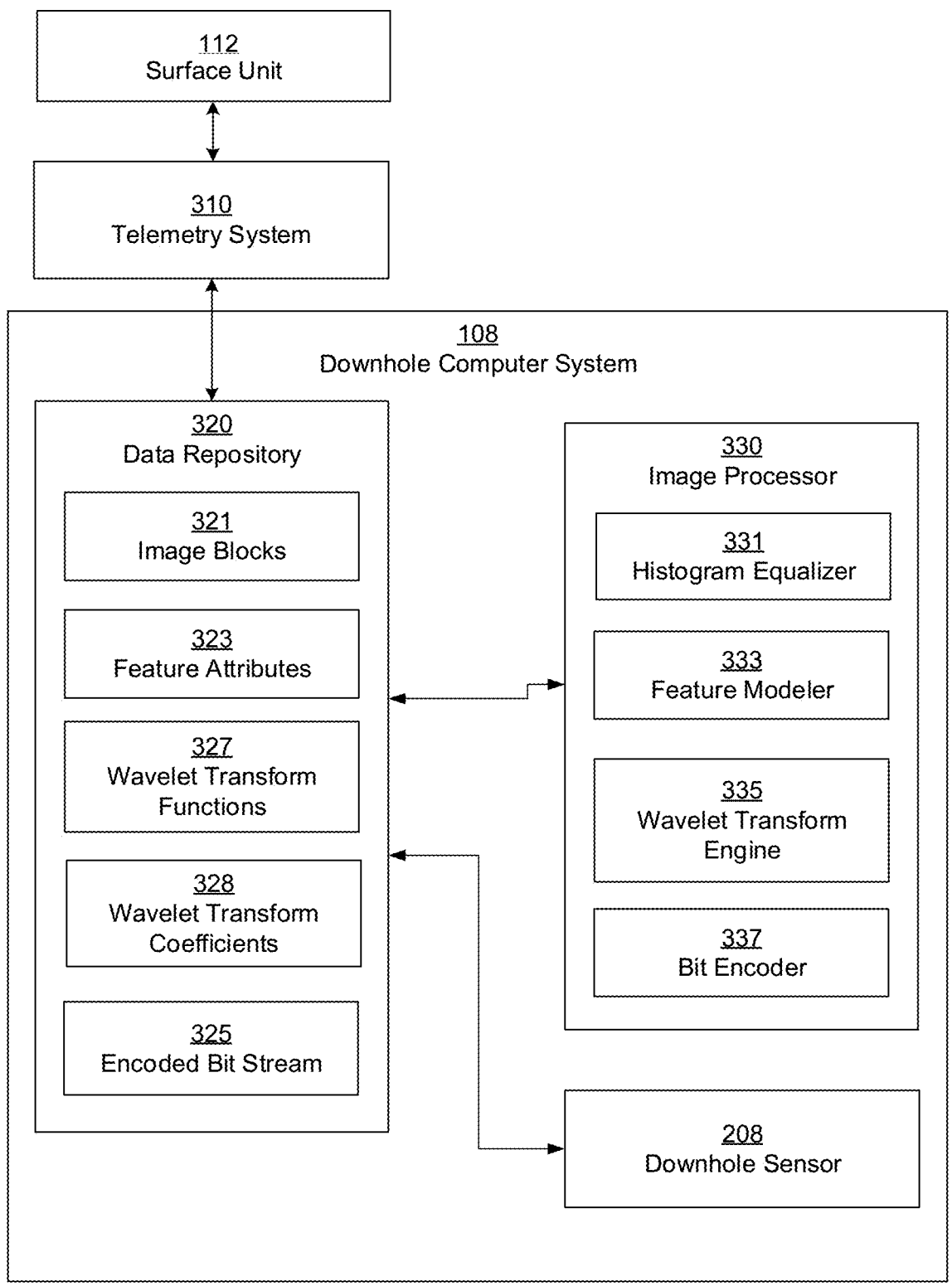
FIG. 3 shows a diagram of a system in accordance with one or more embodiments.

FIG. 3 shows more details of the system of downhole computer system (108), the telemetry system (310), and the surface unit (104) in which one or more embodiments of the technology may be implemented. In one or more embodiments, one or more of the modules and elements shown in FIG. 3 may be omitted, repeated, and/or substituted. Accordingly, embodiments of evaluation of fluid transport properties in heterogeneous geological formations should not be considered limited to the specific arrangements of modules shown in FIG. 3.

As shown in FIG. 3, the downhole computer system (108) includes a data repository (320) for storing input data, intermediate data, and resultant outputs of encoding operation; an image processor (330); and a downhole sensor (208) for acquiring downhole measurements of various formation properties. In one or more embodiments, the data repository (320) may include one or more semiconductor storage devices or other suitable computer data storage devices, or combinations thereof. In one or more embodiments, content stored in the data repository (320) may be stored as a data file, a linked list, a data sequence, a database, any other suitable data structure, or combinations thereof.

In one or more embodiments, the content stored in the data repository (320) includes image blocks (321), feature attributes (323), wavelet transform functions (327), wavelet transform coefficients (328), and encoded bit stream (215). Each of these components is discussed below.

The image blocks (321) are successive segments of physical measurements recorded by downhole sensors along the length of the wellbore. An image block is a set of borehole measurements. In one or more embodiments, the image block includes a set of pixels, each pixel representing measurement at a location in the borehole. Pixels may be in a graphical representation at the surface or stored representation downhole and/or at the surface. In the stored representation, the location of the measurement value in a data structure storing the pixels defines the location in the image block in one or more embodiments. At the surface, the pixels may be represented graphically as image strips in which the measurements are color code. An image strip includes a predefined number of pixels, each pixel representing a value of a measurement (e.g., a measurement discussed above with reference to FIG. 1) of the formation crossed by the bottom hole assembly recorded at a certain direction around the borehole. In one or more embodiments, each image strip corresponds to a defined depth interval along the borehole. An image block may have a predefined number of image strips (lines). For example, an image block may contain 32 lines, a line being scanned every 4 sec. For an average rate of penetration of 24 m/h, the thickness of each line represents 4 cm of formation being drilled or 1.28 m for each image block. In one or more embodiments, the image blocks (321) store measurements of the subterranean formation around the wellbore, each value being mapped to a pixel on the image strip according to its directional location on the borehole. For example, the image blocks may represent the values of resistivity measurements around the borehole. In one or more embodiments, each pixel from a line of the image block may be assigned to an azimuthal bin (or section) based on the directional location of the measurement. For example, the borehole section may be split in 80 azimuthal bins, resulting a span of 4.5 degree of subsurface formation measured per pixel in the image block.

In one or more embodiments, each image block (321) is identified relative to the path distance to the top of the wellbore, rather than relative to the surface of the earth. The path distance may be referred to as Measured Depth (MD). For horizontal wells, the MD distance may be transformed into the distance to the surface called True Vertical Depth Sub Sea (TVDSS) and the horizontal distance from the top of the wellbore called True Horizontal Length (THL). Other measurements of distance may be used without departing from the scope of one or more embodiments.

The feature attributes (323) are a set of geometric properties defining a subterranean formation structure attributes. In one or more embodiments, the feature attributes refer to a set of properties of a subsurface geologic object extractable from the image blocks. For example, if the borehole crosses a formation boundary plane, fault plane or bedding plane under a less than vertical angle, the trace of geologic object plane is projected on the surface of the borehole as a dip line. In the example, the dip line may have a sinusoid trajectory as displayed on the image block. The sinusoid amplitude and phase expresses the geometric dip attitude of the crossed geologic object as regarding to the trajectory of the borehole. Further, the sinusoid amplitude and phase of the dip line corresponding to the dip magnitude and dip orientation respectively may be extracted as feature attributes from the image block.

The wavelet transform functions (327) are a collection of wavelets used to reconstruct a source signal carrying information to be analyzed. In one or more embodiments, the source signal is extracted from an image block by a wavelet transforming operation. In one or more embodiments, the collection of elementary wavelets may be a dictionary of atoms, each elementary function (wavelet transform function) representing an atom. In one or more embodiments, given a dictionary forming an algebraic basis, the signal is uniquely represented as the linear combination of the dictionary of atoms. In one or more embodiments, the dictionary may be an orthogonal dictionary or the dictionary may be rotated to accommodate specific features of the source signal. In one or more embodiments, the dictionary of atoms may be built based on mathematical models. In one or more embodiments, the dictionary of atoms may be built based on a set of data realization by machine learning technology. The elementary transform functions, elementary wavelets or atoms may be interchangeably used through this application.

The wavelet transform coefficients (328) are sets of numerical arguments corresponding the wavelet transform functions in order to reproduce a source image block. In one or more embodiments, the wavelet transform coefficients represent the correlation between the wavelet transform functions and a localized section of the source signal. In one or more embodiments, the wavelet transform coefficients are calculated for each wavelet transform function, wavelet transform coefficients giving a spatial correlation relating the wavelet transform functions to the source signal.

The encoded bit streams (215) are sequence of bits containing information regarding the compressed image block. In one or more embodiments, the encoded bit streams contain the feature attribute and wavelet transform coefficients to be used to decompress the image block at a remote location.

Continuing with FIG. 3, the downhole computer system (108) additionally includes a histogram equalizer (331), a feature modeler (333), a wavelet transform engine (335), and a bit encoder (337) in accordance with one or more embodiments. Each of these components is described below.

The histogram equalizer (331) is a software component configured to remap the values of pixels in the image block to a set of statistical bins spanning a predefined interval. In one or more embodiments, the histogram equalizer (331) read a source image block and generates an object image block with enhanced image contrast. In one or more embodiments, the histogram equalizer modifies the image contrast to be uniformly distributed in the full intensity range.

The feature modeler (333) is a software component that is configured to analyze an image block and extract a set of feature attributes characterizing each image block. In one or more embodiments, the feature modeler (333) models the features of a geologic object representation on the image block (such as dip line) by a cosine wave. In one or more embodiments, the feature modeler (333) analyzes the image of the image block and detects the parameters of a cosine function offering the best match to the cosine wave modeled form the image.

The wavelet transform engine (335) is a software component that is configured to determine a set of wavelet transform coefficients by applying filtering operations to a source signal. In one or more embodiments, the wavelet transform engine (335) is configured to perform a wavelet decomposition in order to achieve high compression of the image block. In one or more embodiments, the output of a wavelet transform performed by the wavelet transform engine (335) is a set of wavelet transform coefficients. An inverse wavelet transform applied to the transform coefficients gives the borehole image, or a compressed version of the image block if the transform coefficients have been quantized. In other words, the inverse of the wavelet transform builds the borehole image as a weighted linear combination of the elementary wavelets.

The bit encoder (337) is a software component that is configured to parse a compressed image block and produce a succession of encoded bit streams to be remotely transmitted. In one or more embodiments, the bit encoder (337)

is configured to scan the wavelet transform coefficients and assign the coefficient values to a location in the bit stream.

In one or more embodiments, the downhole computer system (108) includes a downhole sensor (208) which is configured to acquire a set of data from the wellbore regarding one or more properties of the subsurface formations. In one or more embodiments, the downhole sensor (208) performs LWD and is configured to acquire measurements around the borehole to be assembled in image blocks. In one or more embodiments, the downhole sensor (208) may be rotating with the drill string and acquire directional measurements, each measurement including information to map the measurement on the image block line. In one or more embodiments, the downhole sensor (208) may include functionality to perform caliper logging, acquire annulus pressure and equivalent circulating density (ECD) measurements, perform a well survey, acquire shock and vibration measurements, and obtain formation information at the drilling depths and ahead of a bit. The information collected by the downhole sensor (208) is processed by the image processor (330) and conveyed to the surface unit (104).

In one or more embodiments, the telemetry system (310) is hardware and software system configured to automate a communications process by which measurements and other data collected at a remote location are transmitted to a receiving equipment for monitoring, storage or analysis. In one or more embodiments, a telemetry system may operate through the wellbore and transmit the subsurface measurements acquired by the downhole computer to the surface unit. For example, the telemetry system may transmit encoded bit streams through pulses applied to the drilling fluid circulating through the wellbore or may use low-frequency electromagnetic waves to transmit information.

In one or more embodiments, the surface unit (112) is a computer system configured to receive compressed downhole data representing characteristics of the subterranean formations sent as a stream of encoded bits. In one or more embodiments, an image block may be obtained by decoding the information transmitted in the encoded bits. In one or more embodiments, the compressed downhole data may include well data, information related to the location and dip of the formations and fault surfaces, characteristics of the formation rocks (e.g., resistivity, density, natural gamma ray, natural fractures, dip magnitude and orientation of subsurface formations, etc.), or a combination of thereof, during a drilling operation of the wellbore (103) at the wellsite system (110).

Figure 4:
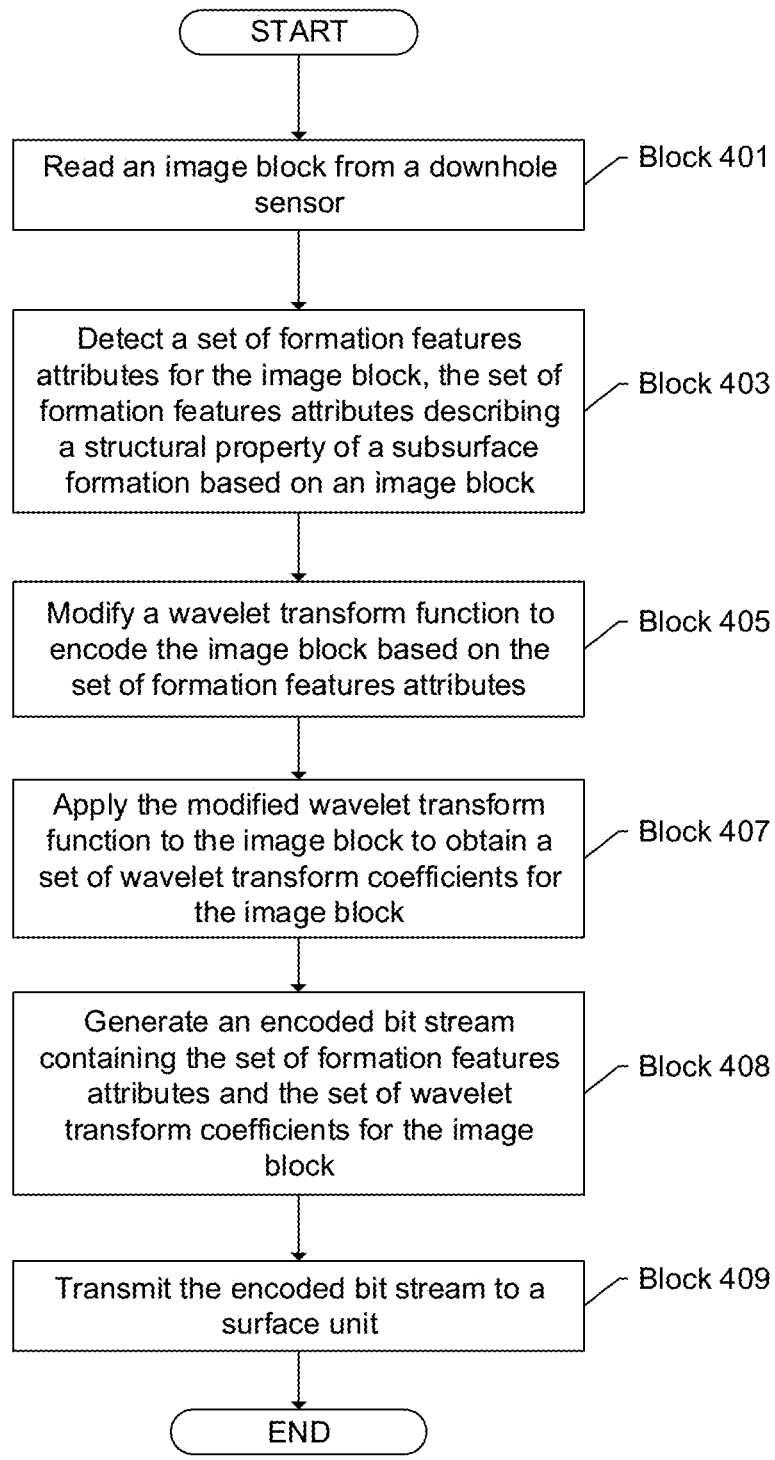

FIG. 4 depicts a flowchart of an example method in accordance with one or more embodiments. For example, the method depicted in FIG. 3 may be practiced using the downhole computer system (108) described in reference to FIGS. 1, 2, and 3 above. In one or more embodiments, one or more of the elements shown in FIG. 4 may be omitted, repeated, and/or performed in a different order. Accordingly, one or more embodiments should not be considered limited to the specific arrangements of elements shown in FIG. 4.

In Block 401, a first image block is obtained from a downhole sensor. In one or more embodiments, the image block is created by converting the electric signals from the borehole sensor into a range of values representing a physical property of the subsurface formation. For example, the electrical current measurements are converted to resistivity, which may be exponentially distributed in the range of 0.1 to 1000 Ωm for instance. In one or more embodiments, the values read from the downhole sensor are assembled into an image block according to the values location around the borehole and the MD of the measurement. In other words, the values are assembled into a map of pixels, each pixel expressing the value of the physical property of the formation at the corresponding location around the borehole. Further, the data in the image block may be equalized by a histogram equalizer. Equalization is a mapping applied to each pixel of the image, the mapping assigning each value corresponding to each pixel of the image block to a range class from a predefined number of range classes covering a value interval. The mapping is designed to amplify the contrast for the low variation of physical property values and suppress the contrast for large variation physical property values. In one or more embodiments, equalization may be configured to uniformly distribute the output pixels in each predefined range class.

In Block 403, a set of formation features attributes for the image block is detected, the set of formation features attributes describing a structural property of a subsurface formation based on an image block. In one or more embodiments, the formation feature attributes detected characterizes the dip magnitude and dip orientation of a subsurface formation, bedding, fault or fracture as presented in an image block. The detection may be implemented by modeling the dip of the respective geologic object by a sinusoid expressed by EQ. 1:

$$f(x) = A\cos\left(\frac{2\pi(x-\tau)}{N_L}\right) + C \qquad \text{EQ. 1}$$

In EQ. 1, $A=[0, \infty]$ is the amplitude corresponding to the dip magnitude, and $\tau$ is the phase shift corresponding to the dip orientation, $N_L$ is number of azimuthal bins in the input image and C is a constant used to shift the dip along the depth of the well.

In one or more embodiments, the resistivity or the intensity of the pixels located on the same dip line are assumed constants and are described by EQ. 2:

$$I(x, f(x)) = K \qquad \text{EQ. 2}$$

In EQ. 2, I(x,y) is the intensity function described at the x,y coordinates, and K is a constant intensity value.

In one or more embodiments, the parameters A and $\tau$ are estimated based on the parametric model in EQ. 1. In one or more embodiments, the parameter C defining the exact location of the dip in the block may be inferred from MD and not used in the compression algorithm. In one or more embodiments, the parameters are estimated sequentially. In other words, first $\tau$ is estimated according to FIG. 5.1 and then A is estimated according to FIG. 5.2 which will be described later in the specification.

In Block 405, a wavelet transform function is modified to encode the image block based on the set of formation features attributes. In one or more embodiments, the extracted feature attributes, the amplitude A and phase shift $\tau$, are used to compensate the wavelet transform functions in order to improve compression performance. In one or more embodiments, the extracted feature attributes of an image block are used to determine a prediction function and an update function. In one or more embodiments, each pixel is considered either an odd pixel or an even pixel based on its order in the image block line. In one or more embodiments, the prediction function generates a set of high pass wavelet transform coefficients $I'_O$ of each odd pixel based on the intensities of said odd pixel and adjacent even pixels. The prediction function may be calculated based on EQ. 3:

$$I'_o[x,y] = I_o[x,y]\alpha(I_E[x,y+\Delta y_1] + I_E[x+1,y+\Delta y_2]) \qquad \text{EQ. 3}$$

In EQ. 3 and EQ.4 below, $I_o$ is an intensity of an odd pixel, $I_E$ is an intensity of an even pixel, and x, y are coordinates of the pixel in the image block.

In one or more embodiments, the update function generates a set of low pass wavelet transform coefficients by updating the wavelet coefficient $I'_E$ of an even pixels from the intensity of said odd pixel and wavelet coefficients from two neighboring odd pixels:

$$I'_E[x,y]=I_E[x,y]\beta(I'_o[x1,y+\Delta y_3]+I'_o[x,y+\Delta y_4]) \qquad \text{EQ. 4}$$

In the above equations, α and β are constants that determine the type of DWT (ie Discrete Wavelet Transform). For example, α=5/3 and β=9/7.

In one or more embodiments, the parameters $\Delta y_1$, $\Delta y_2$, $\Delta y_3$ and $\Delta y_4$ are chosen such that the prediction/update steps are applied in the direction of the dip. In one or more embodiments, the shift may be less than a pixel length prediction and the values of the wavelet transform coefficients are linearly interpolated.

In Block 407, the modified wavelet transform function is applied to the image block to obtain a set of wavelet transform coefficients for the image block. In one or more embodiments, the transformation results in a compressed image block. In one or more embodiments, in the first stage of the two-dimensional (2D) DWT, a wavelet transform engine is applying a one dimensional (1D) DWT to each row of the image followed by applying a 1D DWT each column. In one or more embodiments, the DWT calculates the coefficients using the modified prediction function and the modified update function determined in Block 405. In one or more embodiments, based on the modified prediction and update functions, the prediction and update of the wavelet transform coefficients is performed in the direction of the dip resulting in a reduced magnitude of the high pass coefficients. In one or more embodiments, the reduced magnitude of the high pass coefficients uses less memory bandwidth improving the compression performance. In one or more embodiments, the feature compensated DWT is selected for encoding.

In one or more embodiments, the results may be degraded if an error exists during the feature estimation. Accordingly, for each image block, a decomposition of the feature compensated DWT and a conventional DWT may be applied. If the transform coefficients of a conventional DWT have a lower median magnitude than the feature compensated version, the conventional DWT is selected for encoding.

In Block 408, an encoded bit stream is generated, the bit stream containing the set of formation features attributes A and T and the set of wavelet transform coefficients for the image block $I'_o(x,y)$ and $I'_E(x,y)$. In one or more embodiments, the wavelet transform coefficients of the selected DWT are quantized and entropy coded. In one or more embodiments, the transform coefficients are segmented into blocks. In one or more embodiments, each individual block of transform coefficients is assigned to a macro-block. Further, the macro-blocks are quantized and entropy coded to generate a separate bit stream for each block. In one or more embodiments, the bit streams may be truncated at any point to reconstruct a macro-block with different levels of distortion. In one or more embodiments, the encoding is configured to support a wide range of data rates.

DWT techniques for performing lifting-based prediction in local windows in the direction of the high pixel correlation and compensate the coding (as here in the direction of the feature) are already known in the art, for instance from the article "Adaptive Directional Lifting-Based Wavelet Transform for Image Coding" (IEEE Transactions on Image Processing, VoL. 16 NO. 2, Febrary 2007, W. Ding, F. Wu; X, Wy, S. Li, H. Li) and will not be detailed hereinafter.

In one or more embodiments, the encoding models the image block I(x,y) as a weighted linear combination of dictionary atoms:

$$I(x,y)=\Sigma_{i=1}^{N_b}\alpha_i\varphi_i(x,y), \qquad \text{EQ. 5}$$

where $\{\alpha_i\}_{i=1:N_b}$ are the wavelet transform coefficients ($I_o$ and $I'_E$), the set $\{\varphi_i(x,y)\}_{i=1:N_b}$ are the corresponding dictionary atoms, and $N_b$ is the total number of atoms in the representation. To compress the borehole image, a subset of the wavelet transform coefficients is quantized and entropy coded. In the quantization stage (non-invertible), the wavelet transform coefficients are mapped to a countable set by, for example, a rounding operation. Entropy coding (invertible operation) reduces the redundancy in the set and maps the values to a bit stream. In one or more embodiments, the bit streams are compressed further to comply with a target data rate constraint. In one or more embodiments, the output of the quantization and entropy coding stage is a set of distortion/bit-rate scalable bit streams, each bit streams corresponding to a macro-block of wavelet transform coefficients. In one or more embodiments, based on the telemetry rate, a selection of bits may be transmitted to the surface. In one or more embodiments, a rate allocation is performed to decide which bits are prioritized for transmission. The output of the rate allocation is a set of truncated encoded bit streams corresponding to each macro-block.

In Block 409, the encoded bit stream is transmitted to a surface unit. In one or more embodiments, the output bit stream is sent to the telemetry system and transmitted to the surface. Further, to decompress the image the surface unit executes the inverse operations of entropy coding and quantization. An approximation of the borehole image $\hat{I}(x,y)$ at the surface is then given by $$\hat{I}(x,y)=\Sigma_{i=1}^{N_b}\hat{\alpha}_i\varphi_i(x,y), \qquad \text{EQ. 6}$$

where $\hat{\alpha}_i$ are the quantized transform coefficients (the transform coefficients are set to zero ($\hat{\alpha}_i=0$) if the dictionary of atoms are not sent).

FIGS. 5.1 and 5.2 show flowcharts for determining the feature attributes in block 403 in accordance with one or more embodiments. However, the method described below is exemplary and any method for determining the feature attributes may be used in the method 400 While the various blocks in these flowcharts are presented and described sequentially, one of ordinary skill will appreciate that at least some of the blocks may be executed in different orders, may be combined or omitted, and at least some of the blocks may be executed in parallel. Furthermore, the actions in the blocks may be performed actively or passively. For example, some actions may be performed using polling or be interrupt driven in accordance with one or more embodiments. By way of an example, determination blocks may not involve a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

FIG. 5.1 shows a general flowchart to determine the value of the feature phase shift based on the data present in an image block. In one or more embodiments, the value of the feature phase shift is estimated based on the location of the symmetry line.

In Block 511, a candidate solution is selected as value for a feature phase shift of an image block from a set of candidate solutions. In one or more embodiments, the $\tau_i$ candidate solution is selected from a set of candidate solution in a solution domain. In one or more embodiments, the candidate solution may be a random value for a feature phase shift selected from the solution domain.

In Block 513, a symmetry level of the feature phase shift is evaluated based on the value of the selected candidate solution. In one or more embodiments, the input image block is split into a right and left hand side image using EQ. 7 and EQ. 8:

$$L(x,y,\tau_i)=I(\tau_i+x,y), x \in [1,40] \quad \text{EQ. 7}$$

$$R(x,y,\varphi_i)=I(x+\tau_i+40,y), x \in [1,40] \quad \text{EQ. 8}$$

In EQ. 7 and EQ. 8, the width of the image $N_L$ is 80 azimuthal bins. In one or more embodiments, periodic extensions are applied if $\tau_i+x<1$ or $x+\tau_i+40>80$. In one or more embodiments, the periodic extensions are defined by EQ. 9:

$$I(x, y) = \begin{cases} I(x+80, y), & \text{if } x < 1 \\ I(x-80, y), & \text{if } x > 80 \end{cases} \quad \text{EQ. 9}$$

In one or more embodiments, an error metric associated with the symmetry level determined with the phase shift is defined by EQ. 10:

$$J(\tau_i)=\Sigma_{x=1}^{40}\Sigma_{y=1}^{N_D}|L(x,y,\tau_i)R(40+1x,y,\tau_i)| \quad \text{EQ. 10}$$

In EQ. 10, $N_D$ is the length of the block in the depth dimension.

In Block 515, a test is performed to determine if the symmetry level is a maxima. In one or more embodiments, the symmetry level is a maxima for a minimum of $J(\tau_i)$. In one or more embodiments, an estimate for $\tau$ is selected as the parameter which minimizes $J(\tau_i)$ as shown in EQ. 11:

$$\tau' = \min_{\tau_i}\{J(\tau_i)\} \quad \text{EQ. 11}$$

In EQ. 11, $\tau'$ is an estimate of the feature phase shift.

If the symmetry level is not a maxima, a new candidate solution is selected in Block 511. Blocks 511-515 may be iterately performed for each of the plurality of the candidate solutions.

In Block 517, if the symmetry level is a maxima the value of the feature phase shift is returned.

FIG. 5.2 shows a general flowchart to determine the value of the feature dip magnitude based on the data present in an image block. In one or more embodiments, the method estimates the magnitude of the dip based on the value of the phase shift.

In Block 521, a portion of an image block is selected based on the value of the feature phase shift for the image block. In one or more embodiments, the image on the left side is used as defined in Block 513 (EQ. 7). In one or more embodiments, the image on the right side may be used instead of the image on the left.

In Block 522, a gradient of the dip θ is calculated at the location of each pixel (x,y) of the selected portion of the image block based on EQ. 12:

$$\theta(x,y) = \tan^{-1}\left(\frac{\partial L(x,y)}{\partial x} \bigg/ \frac{\partial L(x,y)}{\partial y}\right) \quad \text{EQ. 12}$$

In Block 523, an angle of the dip is calculated at the location of each pixel of the selected portion of the image block based on gradient of the dip at the location of the selected pixel. In one or more embodiments, the angle of the dip is related to the gradient of the dip at each point (x,y) as defined by EQ. 13:

$$\frac{df(x,y)}{x} = \tan(\theta(x,y)) = \frac{\partial L(x,y)}{\partial x} \bigg/ \frac{\partial L(x,y)}{\partial y} \quad \text{EQ. 13}$$

In Block 525, a value of the feature dip magnitude is calculated for each pixel of the selected portion of the image block based on the pixel angle of dip. In one or more embodiments, the feature dip magnitude A at each pixel location (x,y) is calculated based on EQ. 14:

$$A(x,y) = \frac{\partial L(x,y)}{\partial x} \bigg/ \frac{\partial L(x,y)}{\partial y} \times \frac{N_L}{2\pi} \times \frac{1}{\sin(2\pi(x-\varphi)/N_L)} \quad \text{EQ. 14}$$

In Block 527, a probability density function of the dip magnitude is generated. In one or more embodiments, based on the values of the dip magnitude of the collection of pixels in the image, the probability distribution function (e.g., histogram) is generated for the dip magnitudes. In one or more embodiments, the probability density function is defined by a histogram of the values A(x,y).

In Block 528, an estimate of the feature dip magnitude is obtained by finding a maximum likelihood estimate of the feature dip magnitude function as described in Block 525 (EQ. 14). In one or more embodiments, an estimate A' of the parameter A is obtained by finding a value which maximizes the probability distribution function described by EQ. 15:

$$A'=\max[f_A(x)], \quad \text{EQ. 15}$$

where $f_A(x)$ is the probability density function of the dip magnitude A and A' is an estimate of the dip magnitude. In one or more embodiments, a maxima may be found by plotting the histogram of $(x,f_A(x))$ and selecting the value which maximizes the probability density function described in Block 527.

In Block 529, the value of the feature dip magnitude is returned. In one or more embodiments, if the estimate A is a maxima the value of the feature dip magnitude is returned.

Figure 6:
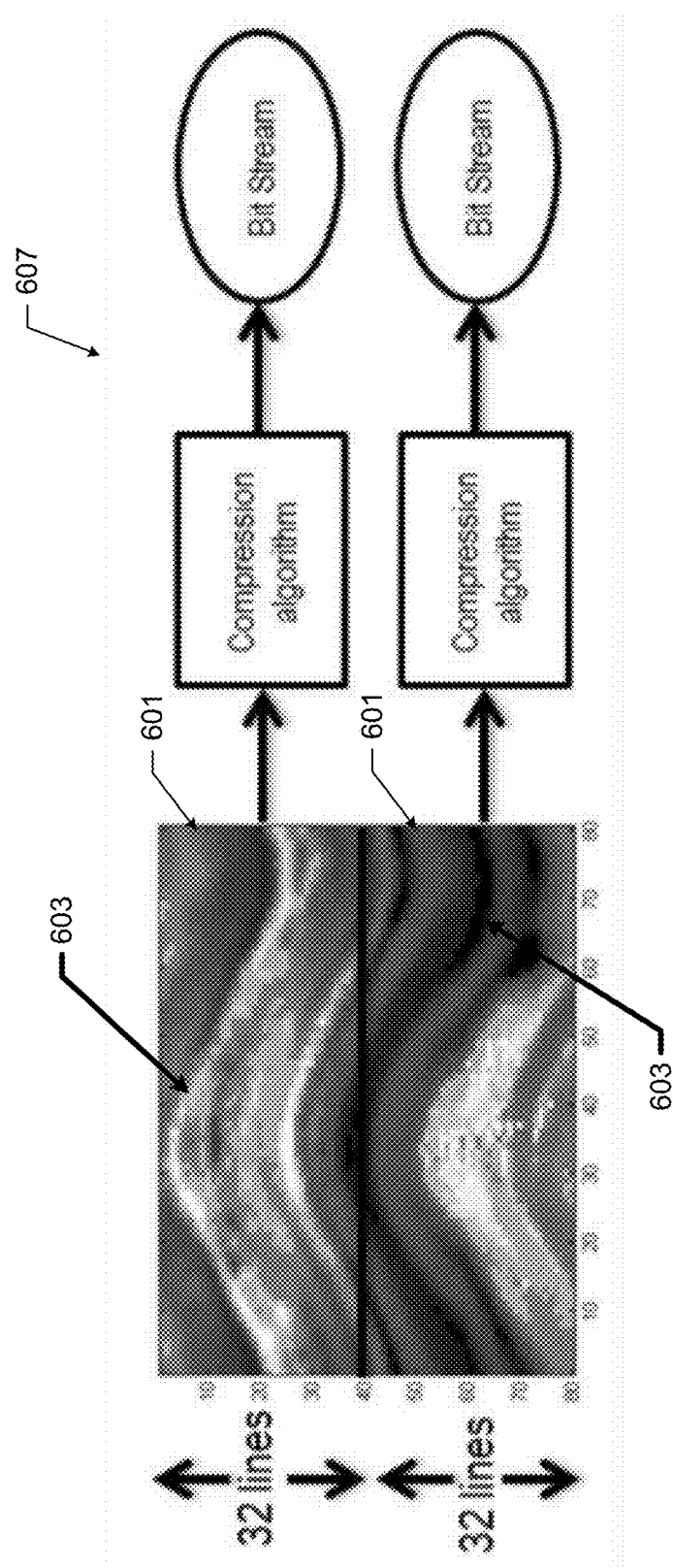

FIG. 6 shows an example of two successive image blocks (601) displaying a dip feature of a geological object. Each image block includes 32 lines of data, each line including 80 azimuthal bins. As seen in FIG. 6, the dip feature is expressed in the image block by multiple sinusoidal dip lines (603) presented as color bands of different intensity in the image. Further, FIG. 6 displays a brief workflow (607) of the embodiment of technology.

FIGS. 7.1 and 7.2 shows an example of the feature attribute estimation. As seen in FIG. 7.1, an angle of a feature present in an image block is traced for estimation (θ'). FIG. 7.2 shows an example of a dip line (721) detected by the feature modeler with the angle of the feature from FIG. 7.1 positioned for estimation (723). As seen in FIG. 7.2, the cosine function (725) used to model the feature is presented.

Figure 8:
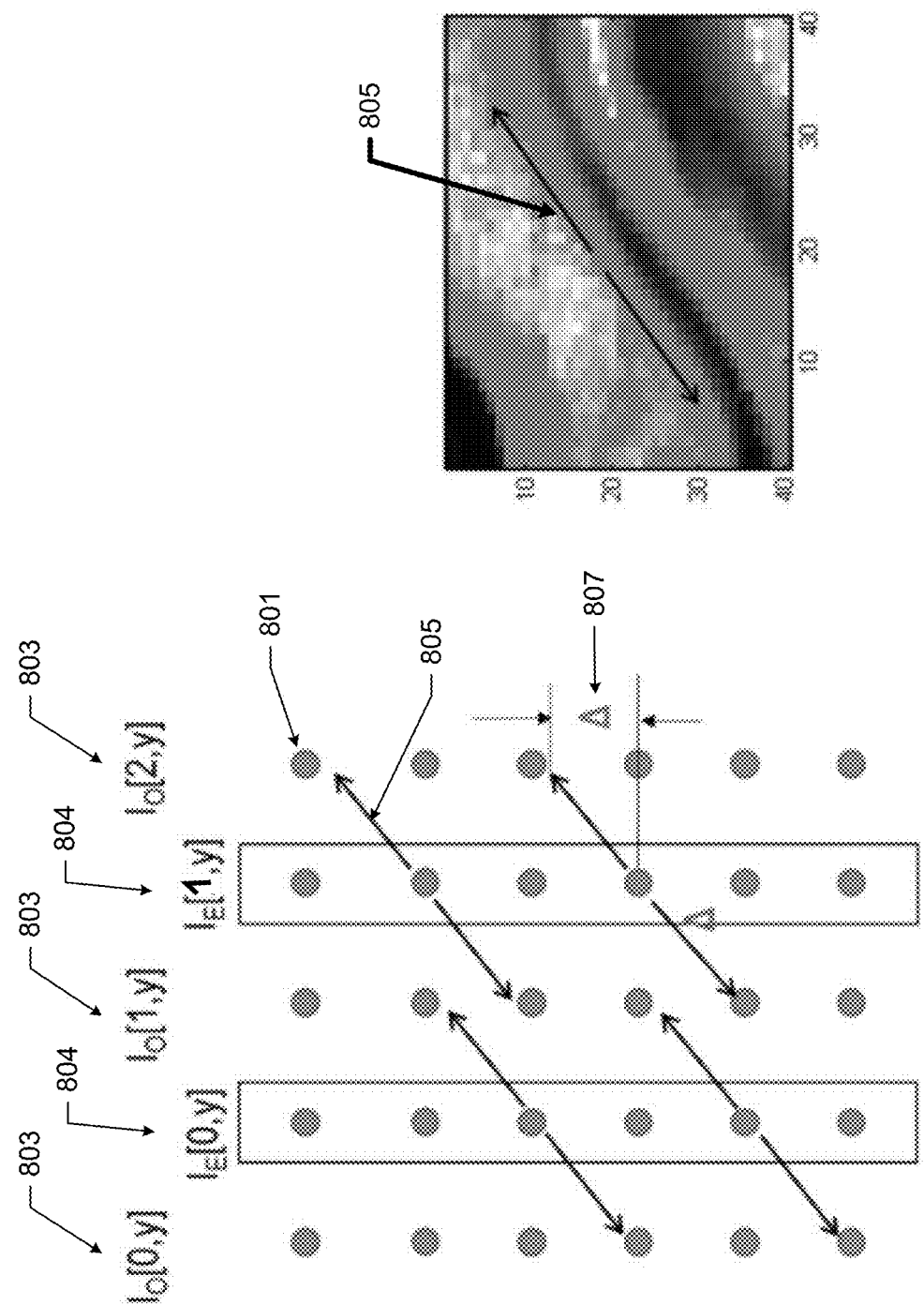

FIG. 8 shows an example of the feature compensated wavelet transformation implementation as shown in block 405. The coefficients of the pixels (801) of an image block are predicted and updated by a filtering operation. The prediction/update method of the embodiment predicts the wavelet transform coefficients of the pixels in the even groups (804) based on the pixels in the odd groups (803) along a dip line (805) as defined by a set of feature attributes calculated in FIG. 7.1 and FIG. 7.2. As seen in FIG. 8, the prediction/update method of the feature compensated DWT is offset by A (807). The values of A are defined by the estimated dip parameters and may be different for each pixel location.

Embodiments may be implemented on a computing system. Any combination of mobile, desktop, server, router, switch, embedded device, or other types of hardware may be used. For example, as shown in FIG. 9.1, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, diskette, tape, flash memory, physical memory, or any other computer readable storage medium. Specifically, the software instructions may correspond to computer readable program code that, when executed by a processor(s), is configured to perform one or more embodiments.

The computing system (900) in FIG. 9.1 may be connected to or be a part of a network. For example, as shown in FIG. 9.2, the network (920) may include multiple nodes (e.g., node X (922), node Y (924)). Each node may correspond to a computing system, such as the computing system shown in FIG. 9.1, or a group of nodes combined may correspond to the computing system shown in FIG. 9.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform at least a portion of one or more embodiments.

The computing system or group of computing systems described in FIGS. 9.1 and 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, signal, socket, message queue, pipeline, semaphore, shared memory, message passing, and memory-mapped file. Further details pertaining to some of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of this disclosure. The processes may be part of the same or a different application and may execute on the same or a different computing system.

Rather than or in addition to sharing data between processes, the computing system performing one or more embodiments may include functionality to receive data from a user. For example, in one or more embodiments, a user may submit data via a GUI on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using the techniques described above or from storage, the computing system, in performing one or more embodiments, may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, N-th token in a data stream, etc.), attribute (where the attribute is associated with one or more values), or a hierarchical/tree structure including layers of nodes at different levels of detail (e.g., in nested packet headers or nested document sections). Then, the raw unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9.1, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then, the DBMS interprets the statement. The statement may be a select statement to request information, update statement, create statement, delete statement, etc. Moreover, the statement may include parameters that specify data, or a data container (e.g., database, table, record, column, view, etc.), identifier(s), conditions (e.g., comparison operators), functions (e.g. join, full join, count, average, etc.), sort (e.g. ascending, descending), or others. The DBMS may execute the statement. For example, the DBMS may access a memory buffer, may access a reference, or may index a file for reading, writing, deletion, or any combination thereof, for responding to the statement. The DBMS may load the data from persistent or non-persistent storage and perform computations to respond to the query. The DBMS may return the result(s) to the user or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 9.1 and the nodes and/or client device in FIG. 9.2. Other functions may be performed using one or more embodiments.

While a limited number of embodiments are described, those skilled in the art, having benefit of this disclosure, will appreciate that other embodiments can be devised which do not depart from the scope as disclosed herein. Accordingly, the scope should be limited only by the attached claims.

What is claimed is:

1. A method for image block transmission comprising:
measuring, using a downhole sensor, a physical property, to obtain a value for each of a plurality of pixels of an image block,
applying a mapping relationship between the plurality of pixels and a set of value bins spanning a predefined value interval to obtain a normalized image block,
reading the normalized image block;
detecting, based on the normalized image block, a set of formation features attributes for the image block, the set of formation features attributes describing a structural property of a subsurface formation, wherein the set of formation features attributes includes at least one of a dip magnitude and a dip orientation;
using a Discrete Wavelet Transform for encoding the normalized image block including determining a set of wavelet transform coefficients for the image block, based on wavelet transform functions, wherein the wavelet transform functions are defined using at least one of the dip magnitude and dip orientation;
generating an encoded bit stream comprising the set of formation features attributes and the set of wavelet transform coefficients for the normalized image block; and
transmitting the encoded bit stream.

2. A method for image block transmission comprising:
reading an image block from a downhole sensor;
detecting, based on the image block, a set of formation features attributes for the image block, the set of formation features attributes describing a structural property of a subsurface formation, wherein the set of formation features attributes includes at least one of a dip magnitude and a dip orientation; wherein detecting the set of formation features attributes further comprises:
selecting a set candidate solutions from a plurality of possible candidate solutions, wherein each candidate solution of the plurality of possible candidate solutions represents a phase shift value;
evaluating a symmetry level of each candidate solution from the selected set of candidate solutions;
detecting a feature phase shift of the image block based on a symmetry level maxima extracted from the symmetry level of each candidate solution, wherein the feature phase shift is a formation feature attribute in the set of formation features attributes; and
presenting the feature phase shift;
using a Discrete Wavelet Transform for encoding the image block including determining a set of wavelet transform coefficients for the image block, based on wavelet transform functions, wherein the wavelet transform functions are defined using at least one of the dip magnitude and dip orientation;
generating an encoded bit stream comprising the set of formation features attributes and the set of wavelet transform coefficients for the image block; and
transmitting the encoded bit stream.

3. The method of claim 2, wherein detecting the set of formation features attributes further comprises:
- selecting a portion of the image block based on the feature phase shift of the image block;
- calculating a gradient of the dip at the location of each pixel of the selected portion of the image block;
- calculating a dip magnitude at the location of each pixel of the selected portion of the image block based on the gradient of the dip at the location of each pixel;
- detecting a feature dip magnitude of the image block based on the extracted dip magnitudes at the location of each pixel of the selected portion of the image block, wherein the feature dip magnitude is a formation feature attribute of the set of formation features attributes; and
- returning the feature dip magnitude.

4. The method of claim 1, further comprising:
- detecting an error during a feature estimation; and
- in response to the error, applying an unmodified wavelet transform function to the image block to obtain the set of wavelet transform coefficients for the image block.

5. The method of claim 1, further comprising:
- performing quantization and entropy coding of the set of wavelet transform coefficients to obtain the encoded bit stream.

6. The method of claim 1, further comprising:
- truncating the encoded bit stream in order to satisfy a predefined bit budget threshold criteria.

7. The method of claim 1, further comprising:
- receiving, by a surface unit, the encoded bit stream; and
- decoding, by the surface unit, the encoded bit stream to obtain a reproduction of the image block.

8. A system for image block transmission comprising:
- a downhole sensor that measures a physical property to obtain a value for each of a plurality of pixels of an image block,
- a downhole computer system that:
  - reads an image block from a downhole sensor,
  - applies a mapping relationship between the plurality of pixels and a set of value bins spanning a predefined value interval to obtain a normalized image block
  - detects, based on the normalized image block, a set of formation features attributes for the image block, the set of formation features attributes describing a structural property of a subsurface formation, wherein the set of formation features attributes includes at least one of a dip magnitude and a dip orientation,
  - uses a Discrete Wavelet Transform to encode the normalized image block, wherein the use includes determining a set of wavelet transform coefficients for the image block based on wavelet transform functions, wherein the wavelet transform functions are defined using at least one of the dip magnitude and dip orientation,
  - generates an encoded bit stream comprising the set of formation features attributes and the set of wavelet transform coefficients for the normalized image block, and
  - transmits the encoded bit stream; and
- a surface unit that:
  - receives the encoded bit stream from the downhole computer system, and
  - decodes the encoded bit stream to reproduce the normalized image block encoded by the downhole computer system.

9. The system of claim 8, further comprising:
- a telemetry system for performing a physical transmission of the encoded bit stream, wherein the downhole computer system transmits the encoded bit stream using the telemetry system.

10. A non-transitory computer readable medium, the non-transitory computer readable medium comprising computer readable program code for:
- measuring, using a downhole sensor, a physical property, to obtain a value for each of a plurality of pixels of an image block;
- reading the image block from the downhole sensor;
- applying a mapping relationship between the plurality of data pixels and a set of value bins spanning a predefined value interval to obtain a normalized image block,
- detecting, based on the normalized image block, a set of formation features attributes for the image block, the set of formation features attributes describing a structural property of a subsurface formation, wherein the set of formation features attributes includes at least one of a dip magnitude and a dip orientation;
- using a Discrete Wavelet Transform for encoding the normalized image block including determining a set of wavelet transform coefficients for the normalized image block, based on wavelet transform functions, wherein the wavelet transform functions are defined using at least one of the dip magnitude and dip orientation;
- generating an encoded bit stream comprising the set of formation features attributes and the set of wavelet transform coefficients for the normalized image block; and
- transmitting the encoded bit stream.

11. The non-transitory computer readable medium of claim 10, further comprising computer readable program code for:
- selecting a set candidate solutions from the plurality of possible candidate solutions, wherein each candidate solution of the plurality of possible candidate solutions represents a phase shift value;
- evaluating the symmetry level of each candidate solution from the selected set of candidate solutions;
- detecting a feature phase shift of the image block based on a symmetry level maxima extracted from the symmetry level of each candidate solution, wherein the feature phase shift is a formation feature attribute of the set of formation features attributes; and
- returning the feature phase shift.

12. The non-transitory computer readable medium of claim 11, further comprising computer readable program code for:
- selecting a portion of the image block based on the feature phase shift of the image block;
- calculating a gradient of the dip at the location of each pixel of the selected portion of the image block;
- calculating a dip magnitude at the location of each pixel of the selected portion of the image block based on the gradient of the dip at the location of each pixel;
- detecting a feature dip magnitude of the image block based on a dip magnitude maxima extracted from the dip magnitudes at the location of each pixel of the selected portion of the image block, wherein the feature dip magnitude is a formation feature attribute of the set of formation features attributes; and
- returning the feature dip magnitude.

13. The non-transitory computer readable medium of claim 10, further comprising computer readable program code for:
   detecting an error during a feature estimation; and
   in response to the error, applying an unmodified wavelet transform function to the image block to obtain the set of wavelet transform coefficients for the image block.

14. The non-transitory computer readable medium of claim 10, further comprising computer readable program code for:
   performing quantization and entropy coding of the set of wavelet transform coefficients to obtain the encoded bit stream.

15. The non-transitory computer readable medium of claim 10, further comprising computer readable program code for:
   truncating of the encoded bit stream in order to satisfy a predefined bit budget threshold criteria.

16. The method of claim 2, further comprising:
   measuring, using the downhole sensor, a physical property, to obtain a value for each of a plurality of pixels of the image block.

* * * * *